United States Patent
Yamamoto

(10) Patent No.: US 10,872,242 B2
(45) Date of Patent: Dec. 22, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shinji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 15/908,632

(22) Filed: Feb. 28, 2018

(65) Prior Publication Data
US 2018/0253603 A1   Sep. 6, 2018

(30) Foreign Application Priority Data
Mar. 6, 2017  (JP) .................. 2017-041547

(51) Int. Cl.
| G06K 9/00 | (2006.01) |
| G06T 7/174 | (2017.01) |
| G06T 7/20 | (2017.01) |
| G06T 7/70 | (2017.01) |
| G06K 9/62 | (2006.01) |

(52) U.S. Cl.
CPC ..... *G06K 9/00771* (2013.01); *G06K 9/00335* (2013.01); *G06K 9/6215* (2013.01); *G06T 7/174* (2017.01); *G06T 7/20* (2013.01); *G06T 7/70* (2017.01); *G06T 2207/30196* (2013.01); *G06T 2207/30232* (2013.01)

(58) Field of Classification Search
None
See application file for complete search history.

(56) References Cited

U.S. PATENT DOCUMENTS

| 9,241,138 B2 | 1/2016 | Yoneji | |
| 2005/0073585 A1* | 4/2005 | Ettinger | H04N 7/18 348/155 |
| 2009/0222388 A1* | 9/2009 | Hua | G06N 5/02 706/12 |
| 2010/0201815 A1* | 8/2010 | Anderson | G06K 9/00771 348/148 |

(Continued)

FOREIGN PATENT DOCUMENTS

| JP | 2009075775 A | 4/2009 |
| JP | 2011107765 A | 6/2011 |

(Continued)

OTHER PUBLICATIONS

Dewan Tanvir Ahmed, et al., "Utility Based Decision Support Engine for Camera View Selection in Multimedia Surveillance Systems", Multimed Tools Appl, vol. 73, No. 1, pp. 219-240, 2014, Springer Science+Business Media New York, Dec. 16, 2012 (published online).

(Continued)

*Primary Examiner* — Hadi Akhavannik
(74) *Attorney, Agent, or Firm* — Canon U.S.A., Inc. IP Division

(57) ABSTRACT

In order to reduce a load of checking a result of image analysis, an information processing apparatus detects an object in an image, acquires a position in a monitoring region, acquires a similarity between a target and the detected object, and changes a display format of the object displayed at a position on a region image based on a notice level.

16 Claims, 15 Drawing Sheets

(56) References Cited

U.S. PATENT DOCUMENTS

| | | | | |
|---|---|---|---|---|
| 2010/0215217 | A1* | 8/2010 | Currivan | ............... H04N 7/141 |
| | | | | 382/103 |
| 2013/0208113 | A1* | 8/2013 | Yoneji | ..................... H04N 7/18 |
| | | | | 348/143 |
| 2014/0037147 | A1* | 2/2014 | Yoshio | .............. G06K 9/00778 |
| | | | | 382/107 |
| 2015/0015704 | A1* | 1/2015 | Hirasawa | ............... G06T 7/292 |
| | | | | 348/143 |

FOREIGN PATENT DOCUMENTS

| | | |
|---|---|---|
| JP | 6438861 B1 | 3/2014 |
| JP | 2016154306 A | 8/2016 |
| WO | 2016042946 A1 | 3/2016 |

OTHER PUBLICATIONS

Shoou-I, et al., Harry Potter's Marauder's Map: Localizing and Tracking Multiple Persons-of-Interest by Nonnegative Discretization, CVPR 2013, pp. 3714-3720.

Navneet Dalal, et al., Histograms of Oriented Gradients for Human Detection, http://lear.inrialpes.fr , 2005.

Bruce Xiaohan Nie, et. al., Joint Action Recognition and Pose Estimation From Video, CVPR 2015, pp. 1-9.

Sakrapee Paisitkriangkrai, et. al., Learning to rank in person re-identification with metric ensembles, The University of Adelaide, Australia; and Australian Center for Robotic Vision, arXiv:1503.01543v1 [cs.CV] Mar. 5, 2015.

* cited by examiner

FIG.6

| CAMERA ID | OBJECT ID | DETECTION RECTANGULAR | DETECTION TIME | THUMBNAIL | FEATURE AMOUNT | MAP COORDINATE | NOTICE LEVEL | DISPLAY FORMAT | DISPLAY SIZE |
|---|---|---|---|---|---|---|---|---|---|
| 1 | 1001 | (10,20,10,80) | 12:15:29 | ■ | [************] | (12,60) | 5 | ICON | 3 |
| 1 | 1002 | (40,80,4,50) | 12:15:29 | ■ | [************] | (20,80) | 75 | THUMBNAIL | 20 |
| 1 | 1003 | (80,40,30,160) | 12:15:29 | ■ | [************] | (40,65) | 5 | ICON | 3 |
| 2 | 2001 | (30,60,8,75) | 12:15:29 | ■ | [************] | (130,100) | 5 | ICON | 3 |
| 2 | 2002 | (40,50,43,80) | 12:15:29 | ■ | [************] | (120,80) | 5 | ICON | 3 |
| 3 | 3001 | (45,70,10,90) | 12:15:29 | ■ | [************] | (150,120) | 5 | ICON | 3 |
| 3 | 3002 | (100,10,5,75) | 12:15:29 | ■ | [************] | (130,200) | 5 | ICON | 3 |
| 3 | 3003 | (65,80,10,80) | 12:15:29 | ■ | [************] | (150,350) | 75 | THUMBNAIL | 20 |
| 3 | 3004 | (10,20,10,80) | 12:15:29 | ■ | [************] | (200,320) | 5 | ICON | 3 |
| 4 | 4001 | (40,80,4,50) | 12:15:29 | ■ | [************] | (520,600) | 10 | ICON | 5 |
| 4 | 4002 | (80,40,30,160) | 12:15:29 | ■ | [************] | (550,450) | 10 | ICON | 5 |
| 4 | 4003 | (30,60,8,75) | 12:15:29 | ■ | [************] | (580,500) | 10 | ICON | 5 |
| 4 | 4004 | (40,50,43,80) | 12:15:29 | ■ | [************] | (600,550) | 65 | THUMBNAIL | 10 |
| 5 | 5001 | (45,70,10,90) | 12:15:29 | ■ | [************] | (310,400) | 10 | ICON | 5 |
| 5 | 5002 | (100,10,5,75) | 12:15:29 | ■ | [************] | (300,380) | 10 | ICON | 5 |
| 5 | 5003 | (10,20,10,80) | 12:15:29 | ■ | [************] | (320,420) | 80 | THUMBNAIL | 25 |

ND STORAGE MEDIUM

INFORMATION PROCESSING APPARATUS, INFORMATION PROCESSING METHOD, AND STORAGE MEDIUM

BACKGROUND

Field of the Invention

The present invention relates to an information processing apparatus for monitoring a wide region and tracking a person by using a map image, an information processing method, and a storage medium.

Description of the Related Art

In recent years, along with the progress of an image analysis technique, there has been provided a system for automatically detecting a person to be monitored by executing person collation processing or abnormal behavior detection processing with respect to images captured by cameras installed in a city.

In a display method discussed in Japanese Patent No. 5438861, human identification employing an image recognition technique is executed on images captured by a plurality of cameras, and a camera image that includes a target person is emphasized while the camera image is superimposed and displayed on a map. Further, a method of plotting a position of a person on a map is discussed in "S. Yu, Y. Yang, A. Hauptmann, Harry Potter's Marauder's Map: Localizing and Tracking Multiple Persons-of-Interest by Nonnegative Discretization", in IEEE Computer Society Conference on Computer Vision and Pattern Recognition (CVPR), 2013. With this method, an observer can easily check a position and behavior of a monitoring target person.

However, if a camera image is provided to the observer as it is, the observer has to find a person to be monitored as a tracking target from the camera image. Further, if a position of a person who is assumed to be a tracking target is plotted on a map, the observer has to check the actual camera image in order to check the actual appearance or behavior of that person.

SUMMARY OF THE INVENTION

According to an aspect of the present invention, an information processing apparatus for monitoring a monitoring region by using a plurality of captured images acquired by a plurality of imaging apparatuses, includes a detection unit configured to detect an object in the captured images, an input unit configured to input information about a tracking target in the motoring region, a first acquisition unit configured to acquire a position of an object in the monitoring region, a second acquisition unit configured to acquire a similarity between the object and the tracking target based on information about the object detected by the detection unit and information about the tracking target inputted by the input unit, and a display control unit configured to display a region image corresponding to the monitoring region and an image of a first object detected by the detection unit, which is clipped out of the captured image, at a first position on the region image where the first object is detected, and to display a symbol at a second position on the region image where the second object is detected, wherein the second object has a similarity lower than a similarity of the first object.

Further features of the present invention will become apparent from the following description of exemplary embodiments with reference to the attached drawings.

BRIEF DESCRIPTION OF THE DRAWINGS

FIG. 6 is a diagram illustrating an example of an object information management table.

DESCRIPTION OF THE EMBODIMENTS

Hereinafter, an exemplary embodiment will be described with reference to the appended drawings.

In the processing described in the present exemplary embodiment, a feature quantity of an object is analyzed from a plurality of images, and a result of collating the analysis result with a monitoring target is provided to a user based on a notice level.

Figure 1:
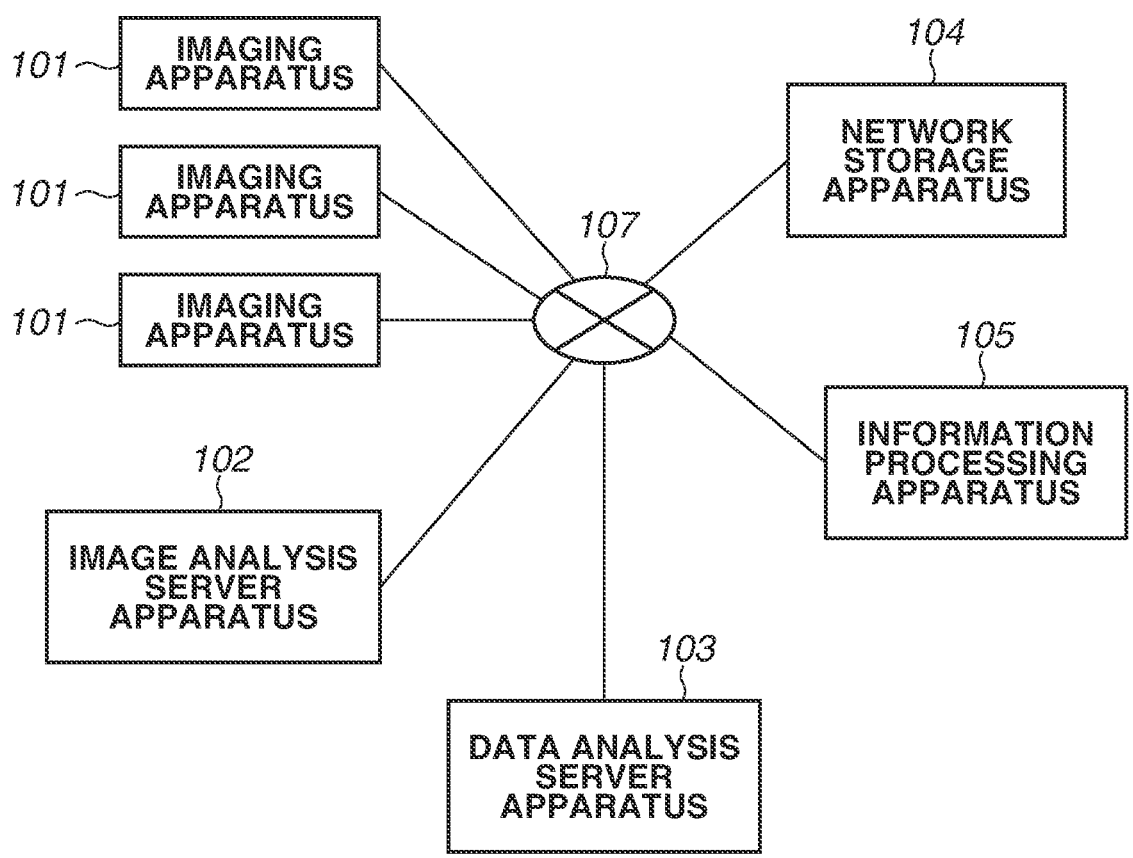
FIG. 1 is a block diagram illustrating an example of a system configuration of an image processing system.

FIG. 1 is a block diagram illustrating an example of a system configuration of an image processing system. The image processing system includes a plurality of imaging apparatuses 101, an image analysis server apparatus 102, a data analysis server apparatus 103, a network storage apparatus 104, and an information processing apparatus 105, which are connected to each other via a local area network (LAN) 107 serving as a network line. The image processing system is an example of an information processing system.

The imaging apparatuses 101 may be network cameras. The image analysis server apparatus 102 collects image data captured by the plurality of imaging apparatuses 101 and executes image analysis processing. For example, the image analysis server apparatus 102 extracts a feature quantity from a face region of a person through the image analysis processing. The data analysis server apparatus 103 collects the feature quantity extracted by the image analysis server apparatus 102 and executes data analysis processing. For example, the data analysis server apparatus 103 collates the feature quantity of persons extracted by the image analysis server apparatus 102 to execute human identification as data analysis processing. The images captured by the imaging apparatuses 101, the feature quantity extracted by the image analysis server apparatus 102, and the collation result of human collation acquired by the data analysis server apparatus 103 are stored in the network storage apparatus 104 via the LAN 107. The information processing apparatus 105 may be an apparatus such as a personal computer. The information processing apparatus 105 includes an input device such as a mouse, a keyboard, and/or a touch panel and a display device such as a display. The information processing apparatus 105 transmits the information received via the input device to the image analysis server apparatus 102 and displays the analysis result acquired by the image analysis server apparatus 102 on the display device. The information processing apparatus 105 superimposes the analysis result on the image data stored in the network storage apparatus 104 and displays it on the display device such as a display.

The imaging apparatuses 101 may be configured of any number of cameras such as two or more cameras. Further, a number of image analysis server apparatuses 102, data analysis server apparatuses 103, network storage apparatuses 104, or information processing apparatuses 105 connected to the LAN 107 is not limited to the number of apparatuses in the present exemplary embodiment illustrated in FIG. 1. A plurality of image analysis server apparatuses 102, data analysis server apparatuses 103, network storage apparatuses 104, or information processing apparatuses 105 may be connected to the LAN 107 as long as the apparatuses can be identified by the addresses.

A PC is assumed to serve as the information processing apparatus 105. However, for example, because a device such as a tablet terminal is connected thereto wirelessly, a physical connection mode with respect to the LAN 107 is not limited to wired connection, and any physical connection mode is possible as long as the apparatus can be connected thereto in terms of a protocol.

Figure 2:
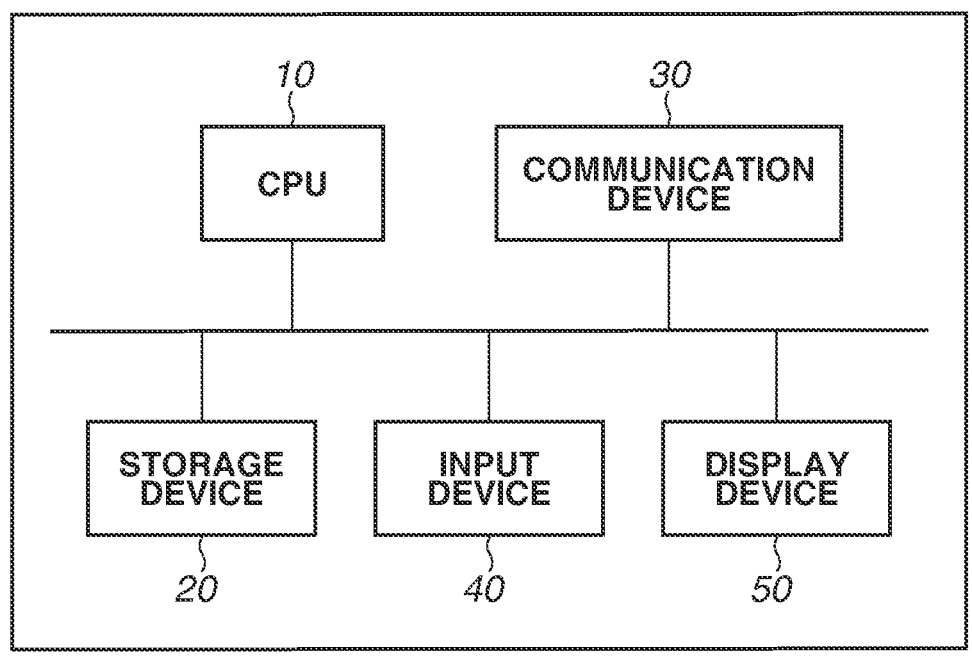
FIG. 2 is a block diagram illustrating an example of a hardware configuration of a data analysis server apparatus.

FIG. 2 is a block diagram illustrating an example of a hardware configuration of the data analysis server apparatus 103. As illustrated in FIG. 2, the data analysis server apparatus 103 includes a central processing unit (CPU) 10, a storage device 20, a communication device 30, an input device 40, and a display device 50 as a hardware configuration.

The CPU 10 executes processing according to a program stored in the storage device 20. The storage device 20 stores a program or data used for the processing executed by the CPU 10. The communication device 30 connects the data analysis server apparatus 103 to the LAN 107. The input device 40 may be a device such as a keyboard or a mouse for inputting a user input to the CPU 10. The display device 50 may be a liquid crystal display for displaying a processing result of the CPU 10 to the user.

The CPU 10 executes processing based on the program stored in the storage device 20 to realize the functional configuration (described below) of the data analysis server apparatus 103 or processing executed thereby illustrated in a flowchart.

Each of the image analysis server apparatus 102, the network storage apparatus 104, and the information processing apparatus 105 also includes a hardware configuration similar to that of the data analysis server apparatus 103 illustrated in FIG. 2. Then, a CPU of each apparatus executes processing based on a program stored in a storage device of the apparatus to realize a functional configuration of the apparatus and processing of the flowchart executed thereby.

However, a constituent element such as the input device 40 or the display device 50 is not essential to the hardware configuration of the data analysis server apparatus 103.

Figure 3:
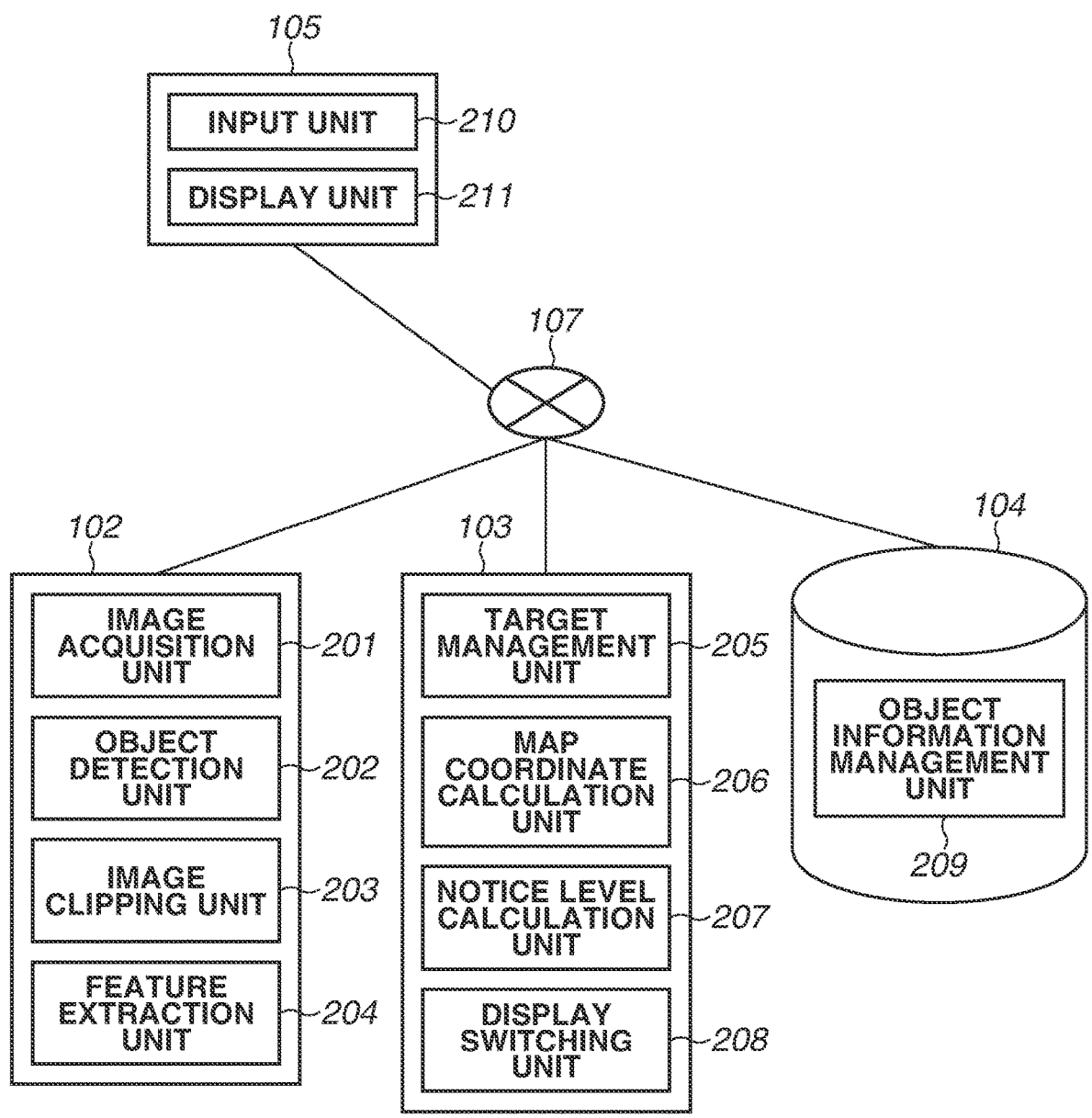
FIG. 3 is a block diagram illustrating an example of a functional configuration of each apparatus constituting the image processing system according to a first exemplary embodiment.

FIG. 3 is a block diagram illustrating an example of a functional configuration of each apparatus constituting the image processing system. As a functional configuration, the image processing system includes an image acquisition unit 201, an object detection unit 202, an image clipping unit 203, a feature extraction unit 204, a target management unit 205, a map coordinate calculation unit 206, a notice level calculation unit 207, a display switching unit 208, and an object information management unit 209. The image processing system further includes an input unit 210 and a display unit 211 as the functional configuration.

The image acquisition unit 201, the object detection unit 202, the image clipping unit 203, and the feature extraction unit 204 are mounted on the image analysis server apparatus 102. The target management unit 205, the map coordinate calculation unit 206, the notice level calculation unit 207, and the display switching unit 208 are mounted on the data analysis server apparatus 103. However, for example, the map coordinate calculation unit 206 and the notice level calculation unit 207 may be mounted on the image analysis server apparatus 102, and allocation of the respective functions is not limited to the example illustrated in FIG. 3.

The image acquisition unit 201 sequentially acquires images from the imaging apparatuses 101 at a predetermined time interval, and provides, via the LAN 107, the images, camera IDs such as internet protocol (IP) addresses associated with the respective imaging apparatuses 101, and imaging time to the object detection unit 202 and the image clipping unit 203. The images acquired by the image acquisition unit 201 is not limited to the captured images acquired from the imaging apparatuses 101. For example, images may be acquired by reading image data (recorded image) from the network storage apparatus 104, or may be acquired through streaming via a network.

The object detection unit 202 executes detection processing of detecting a target from the images provided by the image acquisition unit 201. The object detection unit 202 collectively provides an identifier for uniquely specifying a camera ID and a detected target (hereinafter, referred to as "object ID"), a detection rectangular of the target (position and size), and detection time thereof to the image clipping unit 203 as detection information. The object detection unit 202 uses the imaging time provided by the image acquisition unit 201 as the detection time. For example, as a method of detecting a target from an image, the object detection unit 202 may employ a technique of detecting an entire body of a person described in "N. Dalal, B. Triggs, Histograms of Oriented Gradients for Human Detection" in IEEE Computer Society Conference on Computer Vision and Pattern Recognition (CVPR), 2005.

Figure 4:
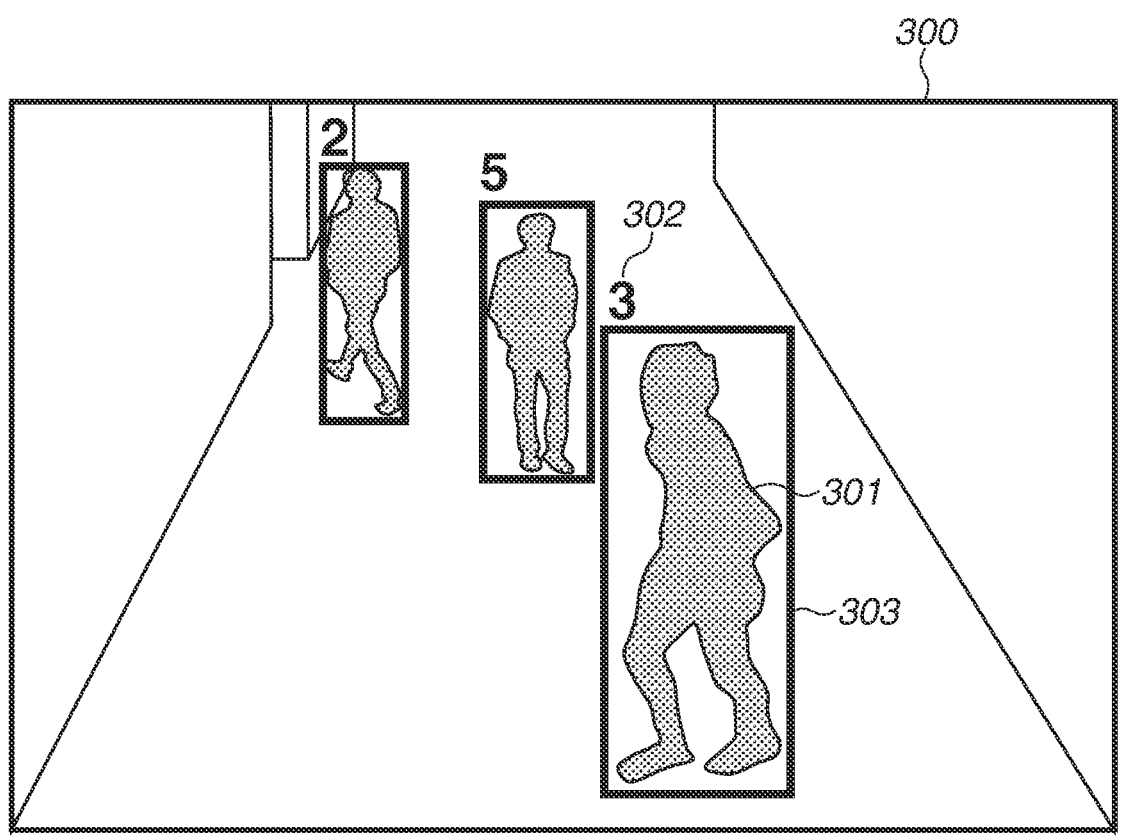
FIG. 4 is a diagram illustrating an object detected from an image as an example of a detection result.

FIG. 4 is a diagram illustrating objects detected from the image as an example of a detection result. The object detection unit 202 executes detection processing on a camera image 300, so that an object ID 302 and a detection rectangular 303 are generated thereby.

The image clipping unit 203 executes processing of creating a clipped image of a target (hereinafter, referred to as "thumbnail") from the images provided by the image acquisition unit 201 and the detection information provided by the object detection unit 202. The image clipping unit 203 provides the created thumbnail to the feature extraction unit 204 in association with the detection information. The image clipping unit 203 uses the detection rectangular included in the detection information provided by the object detection unit 202 to clip only an object region out of the image provided by the image acquisition unit 201 to create the thumbnail.

The feature extraction unit 204 executes feature quantity extraction processing of extracting a feature quantity of the detection target from the thumbnail provided by the image clipping unit 203. The feature extraction unit 204 collectively provides the detection information, the thumbnail, and the feature quantity to the object information management unit 209 as object information. As a feature extraction method, the feature extraction unit 204 may employ a technique of calculating features of an entire body described in "S. Paisitkriangkrai, Learning to rank in person re-identification with metric ensembles" in IEEE Computer Society Conference on Computer Vision and Pattern Recognition (CVPR), 2015.

The target management unit 205 manages information about a target, a target history, and a target candidate and provides the information to the notice level calculation unit 207 and the display switching unit 208. The target refers to an object specified through the input unit 210. The target also refers to object information of the target. The target history refers to a list of information about an object that has been confirmed as a target in the past. The target candidate refers to a list of information about an object that has been collated but has not been confirmed as a target. The target management unit 205 provides the held target information to the notice level calculation unit 207. The target management unit 205 updates the target candidate by using the object information provided by the notice level calculation unit 207. For example, the target management unit 205 adds all of the object information having a collation score (described below) equal to or greater than a threshold value as the target candidates. The target management unit 205 confirms the target candidate that satisfies the update condition as a target, and updates the target information and the target history. For example, if time elapsed from the detection time of the target is a threshold value or more, the target management unit 205 updates the target candidate having the highest collation score as a target. Alternatively, the target management unit 205 updates the target candidate having the collation score equal to or greater than the threshold value as a target regardless of time elapsed from the detection time of the target. The target management unit 205 adds target information to the target history when the target information is updated.

Figure 5A:
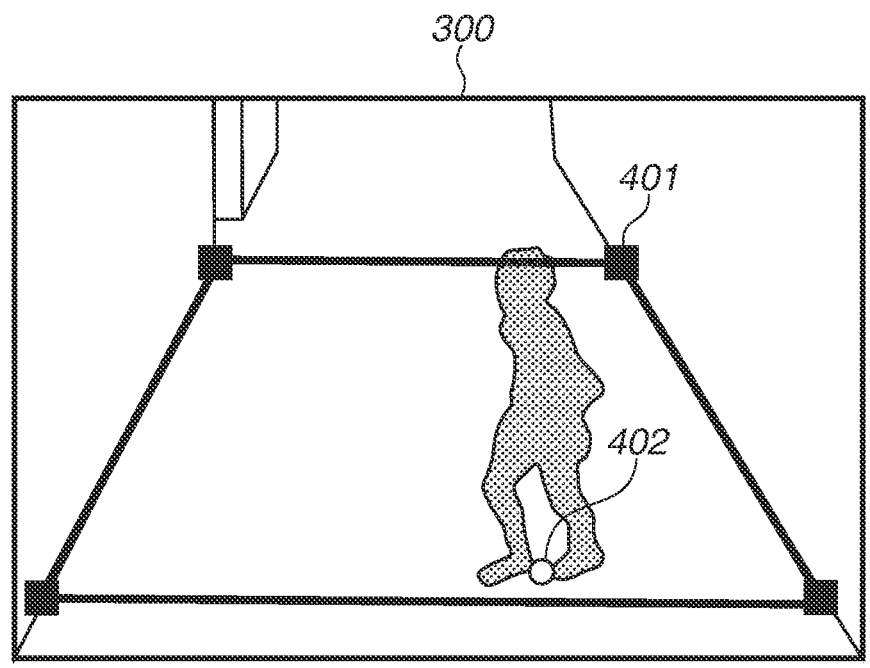
FIGS. 5A and 5B are diagrams each illustrating an example of processing of projecting a foot coordinate to a map coordinate.
Figure 5B:
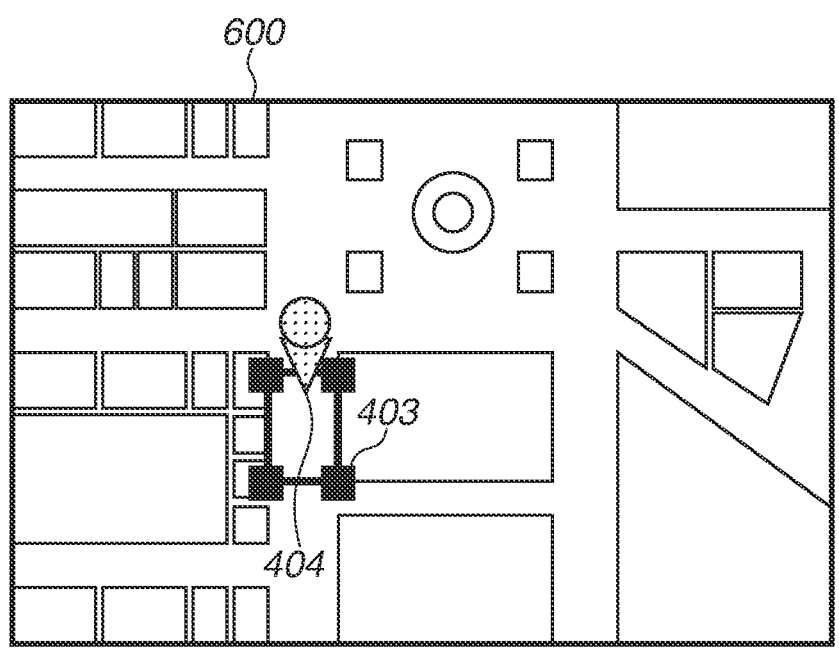

The map coordinate calculation unit 206 calculates a position of the object on the map (hereinafter, referred to as "map coordinate") by using the object information saved in the object information management unit 209, adds the map coordinate to the object information, and provides it to the object information management unit 209. Hereinafter, calculation of the map coordinate will be described. First, the map coordinate calculation unit 206 acquires a projection matrix of a floor face in the camera image and a floor face in the map. For example, the map coordinate calculation unit 206 associates four points in the camera image and four points in the map input through the input unit 210 and acquires a nomography matrix H. Then, the map coordinate calculation unit 206 estimates a foot coordinate of the object in the image from a detection rectangular of the object information. For example, when a foot coordinate fp is (fpx, fpy) and a detection rectangular coordinate r is (rx, ry, rw, rh), the map coordinate calculation unit 206 can acquire the foot coordinate through a formula fp=(rx+rw/2, ry+rh). Values fpx and fpy respectively represent values of an x-coordinate and a y-coordinate. Values rx, ry, rw, and rh respectively represent values of an upper-right x-coordinate, an upper-right y-coordinate, a width, and a height of the rectangular. The map coordinate calculation unit 206 calculates a map coordinate mp. For example, the map coordinate calculation unit 206 executes homography transformation to transform the foot coordinate in the image into the coordinate in the map through calculation of mp=Hfp to acquire the map coordinate mp. FIG. 5 is a diagram illustrating an example of processing of projecting the foot coordinate to the map coordinate. The map coordinate calculation unit 206 inputs a floor face coordinate 401 in the camera image and a floor face coordinate 403 in the map to acquire the homography matrix and projects a foot coordinate 402 onto a map coordinate 404. The foot coordinate in the map can be estimated if three or more points are specified thereto instead of specifying the four points.

The notice level calculation unit 207 uses the target information provided by the target management unit 205 and the object information saved in the object information management unit 209 to compare the feature quantities of the target and the object, and calculates a similarity as a notice level of the object. The notice level calculation unit 207 adds the notice level and the collation score to the object information, and provides it to the target management unit 205 and the object information management unit 209. First, the notice level calculation unit 207 compares the feature quantities to collate persons in the cameras. At this time, the notice level calculation unit 207 specifies the similarity of the feature quantity as the collation score. The collation score is high if the similarity between the objects is high, and the collation score is low if the similarity is low. The notice level calculation unit 207 specifies the collation score itself as the notice level. As a method of comparing the feature quantities, for example, the notice level calculation unit 207 may employ a technique of comparing the features of an entire body described in "S. Paisitkriangkrai, Learning to rank in person re-identification with metric ensembles" in IEEE Computer Society Conference on Computer Vision and Pattern Recognition (CVPR), 2015.

The display switching unit 208 uses the information about a target, a target history, and a target candidate provided by the target management unit 205 and the object information saved in the object information management unit 209 to determine a display format and a display size. The display switching unit 208 adds the display format and the display size to the object information and provides the object information to the object information management unit 209. First, with respect to the object information about the target, the target history, and the target candidate, the display switching unit 208 determines a display format as the thumbnail. Next, with respect to the object information having the notice level equal to or greater than a preset threshold value, the display switching unit 208 determines a display format as the thumbnail. The display switching unit 208 determines a display format as the icon with respect to the object information having the notice level less than the preset threshold value. Further, with respect to all of the object information, the display switching unit 208 sets a display size to be larger if the notice level is higher, and sets the display size to be smaller if the notice level is lower. The processing executed by the display switching unit 208 is an example of display control processing. The icon is an example of a picture schematically illustrating the object.

The object information management unit 209 saves respective pieces of object information received from the feature extraction unit 204, the map coordinate calculation unit 206, the notice level calculation unit 207, and the display switching unit 208 in an object information management table. FIG. 6 is a diagram illustrating an example of the object information management table. The object information management unit 209 can acquire a map coordinate as "(150, 120)" and a display format as "icon" by searching for the information about an object ID 3001.

Figure 7:
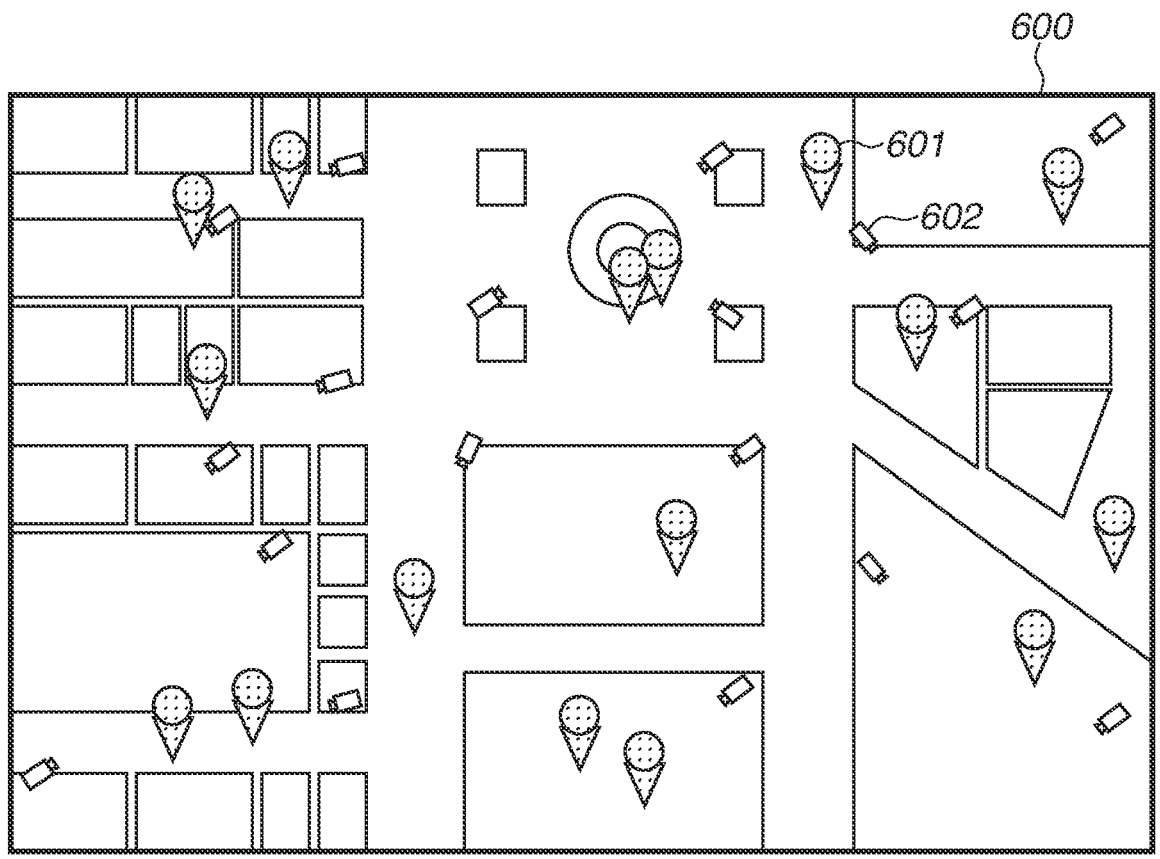
FIG. 7 is a diagram illustrating an example of a display in which a camera icon and a person icon are superimposed on map data.
Figure 8:
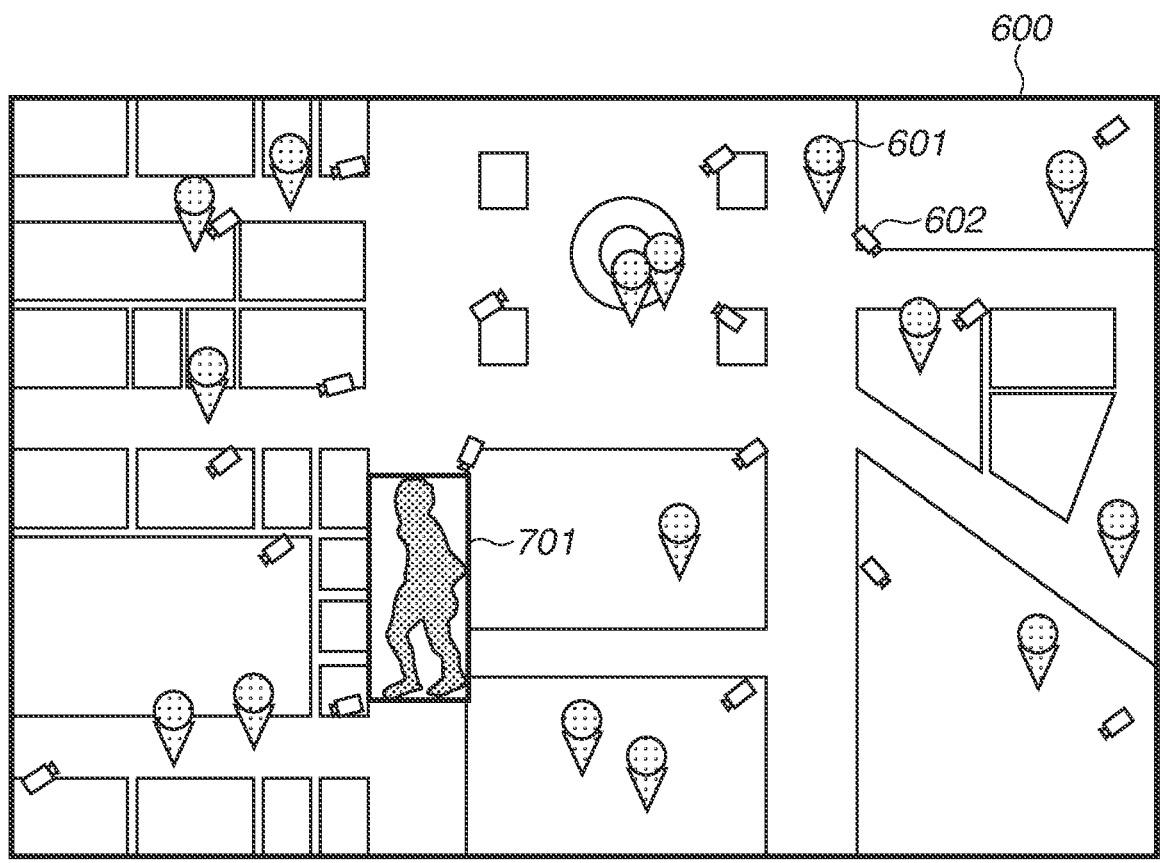
FIG. 8 is a diagram illustrating an example of a display in which object information is displayed by a thumbnail.
Figure 9:
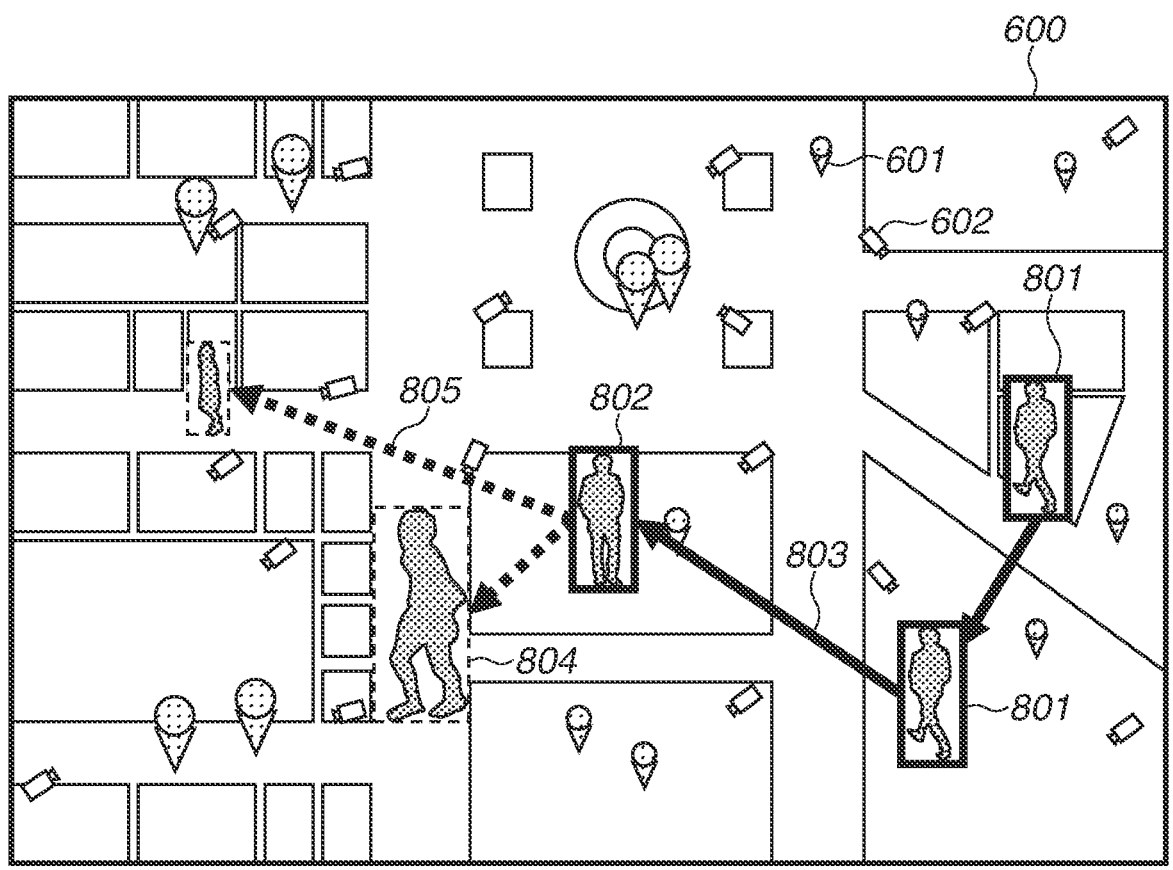
FIG. 9 is a diagram illustrating an example of a display in which a moving path of a target and a previous thumbnail of the target are displayed.

The input unit 210 generates information for specifying a person (hereinafter, referred to as "query"), searches the object information management unit 209 for the object information about the specified person, and provides that object information to the target management unit 205. The object ID can be used as an example of the query. The query is generated by the input unit 210 based on the user operation performed through the input device 40 of the information processing apparatus 105. For example, the display unit 211 uses the information about the target, the target history, and the target candidate saved in the target management unit 205 and the object information acquired from the object information management unit 209, and displays an analysis result on the display device of the information processing apparatus 105 to provide the analysis result to the user. The display unit 211 superimposes and displays a camera icon, a person icon, a thumbnail, and moving path information of the person on preset map data. FIG. 7 is a diagram illustrating an example of the map data on which the camera icon and the person icon are superimposed and displayed. First, the display unit 211 acquires a camera coordinate and a camera orientation from the imaging apparatus 101 or the network storage apparatus 104 and displays a camera icon 602 at a position of the camera coordinate, so that the camera icon 602 is superimposed and displayed on map data 600. Then, the display unit 211 acquires the object information indicating a detection time conforming to a rendering target time from the object information management unit 209. Then, the display unit 211 superimposes a person icon 601 at a position of the map coordinate based on the map coordinate and the display format. FIG. 8 is a diagram illustrating an example of the object information in which a display format thereof is specified as a thumbnail, which is displayed by a thumbnail. When the object information is acquired from the object information management unit 209, the display unit 211 acquires a thumbnail 701 included in the object information if a display format thereof is specified as a thumbnail, and superimposes that image at a position of the map coordinate instead of an icon. FIG. 9 is a diagram illustrating a display example in which a moving path of a target and a past thumbnail of the target are displayed. First, the display unit 211 acquires object information corresponding to the target, the target history, and the target candidate saved in the target management unit 205 from the object information management unit 209. Then, the display unit 211 renders the object information on the map data based on the object information acquired from the object information management unit 209. At this time, the display unit 211 may change a size of the icon or the thumbnail to be rendered based on the display size of the object information. Next, the display unit 211 renders the object information corresponding to a target 802 and a target history 801. The display unit 211 renders the object information corresponding to the target 802 and the target history 801 on the map data 600 even if the detection time does not coincide with the rendering target time. Further, the display unit 211 arranges the target history 801 and the target 802 in the order of detection time, and renders a path line 803 between the map coordinates thereof. The display unit 211 renders the object information corresponding to a target candidate 804. The display unit 211 renders the object information corresponding to the target candidate 804 on the map data 600 even if the detection time does not coincide with the rendering target time. The display unit 211 further renders an auxiliary path line 805 from the target 802 to the target candidate 804. The display unit 211 may change a rendering size of each of the thumbnails of the target history 801, the target 802, and the target candidate 804 based on a display size of the corresponding object information. Further, the display unit 211 may change a frame color of the target candidate that has not been confirmed as a target to express an unconfirmed state. In the example in FIG. 9, the display unit 211 expresses a frame of the target candidate 804 with a dashed line. Further, the display unit 211 may change a line color of the auxiliary path line 805 to express the unconfirmed state. In the example in FIG. 9, the auxiliary path line 805 is expressed by a dashed line. The processing executed by the display unit 211 is also an example of display control processing.

In the present exemplary embodiment, the object detection unit 202 extracts histograms of oriented gradients (HOG) features from the image, and uses a model in which the extracted feature quantity is learned through a support vector machine to identify whether the object is a person. However, the object detection unit 202 may detect the object by using another method. For example, the feature quantity to be extracted is not limited to the HOG features, and the object detection unit 202 may use Hear-Like features or local binary pattern histogram (LBPH) features, or may use a combination of the above features. The extracted feature quantity is shared for detecting a person. Further, a model for identifying a person is not limited to the support vector machine, and the object detection unit 202 may use an adaptive boosting (AdaBoost) classifier or a randomized tree. As a detection result of a person, the object detection unit 202 outputs position coordinates of four vertexes representing a rectangular that surrounds a person in the image. Further, the object detection unit 202 outputs a likelihood representing a detection result together with the position coordinates. The likelihood is a result of collating the extracted feature quantity with a model for identifying a person, and the likelihood represents a coincidence level with respect to the model. Further, in order to specify a position of the target with high precision, the object detection unit 202 may concurrently use a method of tracking a human body. By tracking the person detected through the detection processing in the following frames, a position of the person that cannot be detected by a single image is specified, so that a position of the target can be specified with high precision. Further, a tracking method is not limited to the above-described method, and any method of specifying a position of the target can be used. For example, the object detection unit 202 may use mean-shift tracking, Kalman filter, or on-line boosting as the tracking processing.

The feature extraction executed by the feature extraction unit 204 is processing of extracting a feature of the target, and the processing is not limited to processing of extracting a particular feature quantity. Therefore, any processing of extracting information expressing the target can be executed. For example, the feature extraction unit 204 may use, as a type of a feature quantity, a Scale-Invariant Feature Transform (SIFT) feature or a color histogram, or may combine them. Further, the feature quantity is not limited to the feature of the entire body, but may be a feature quantity limited to a face region.

The map coordinate calculation unit 206 executes processing of transforming a coordinate on an image into a coordinate on a map, and the processing is not limited to a particular transformation processing. Therefore, any processing of transforming a coordinate can be executed.

A thumbnail saved in the object information management unit 209 may be an image or a video image of a clipped object region, and does not have to be a single clipped image. For example, when the object information is saved, the object information management unit 209 may search for information of the same object ID and combines the thumbnails of the same object information in the order of detection time to save the thumbnails as a moving image.

Feature comparison executed by the notice level calculation unit 207 is processing of comparing the features acquired by the feature extraction unit 204, and the method is not limited to a particular comparison method. For example, the notice level calculation unit 207 may use a comparison method such as an L1-distance, a Bhattacharyya distance, or an intersection method.

Figure 10:
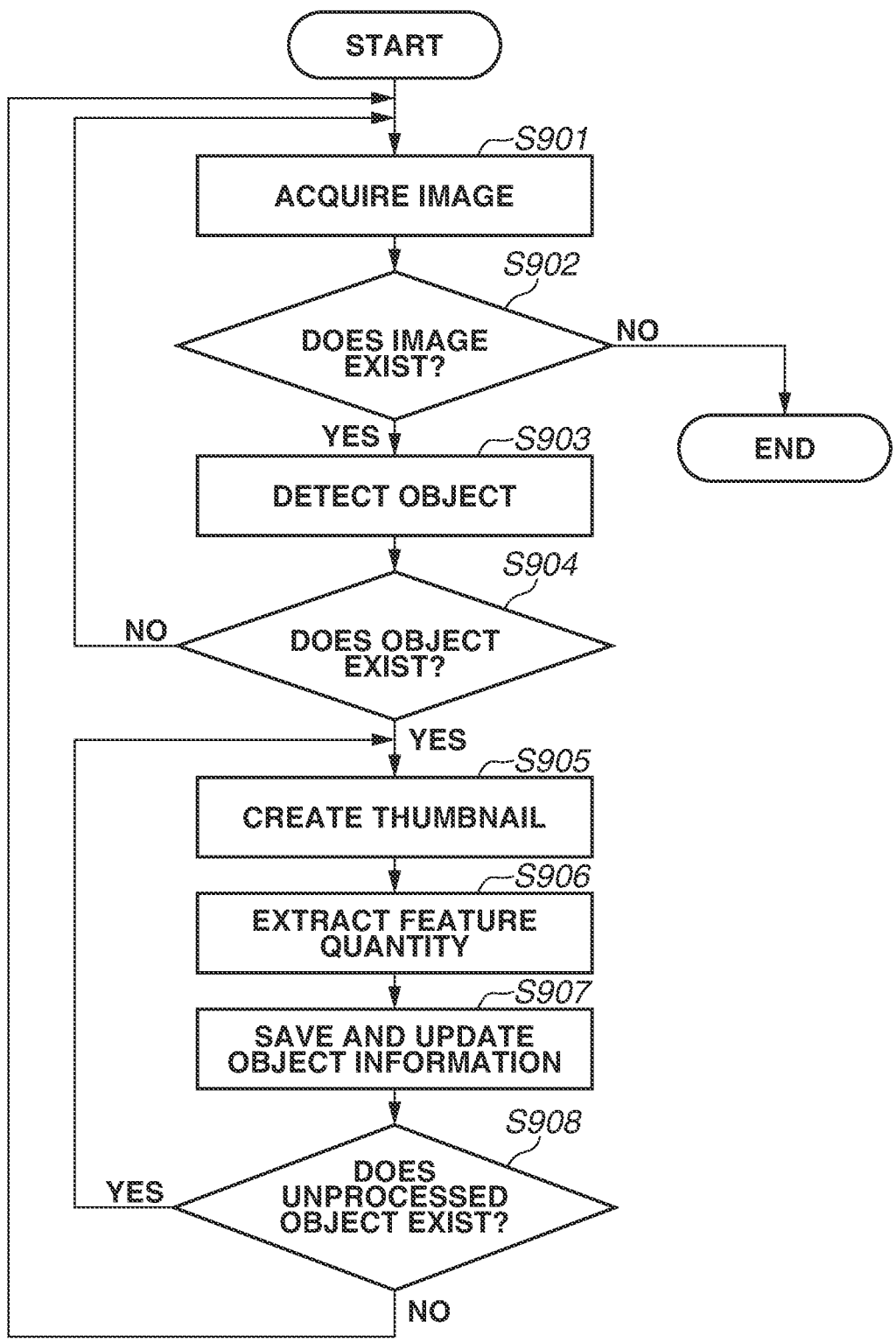
FIG. 10 is a flowchart (part 1) illustrating an example of information processing.
Figure 11:
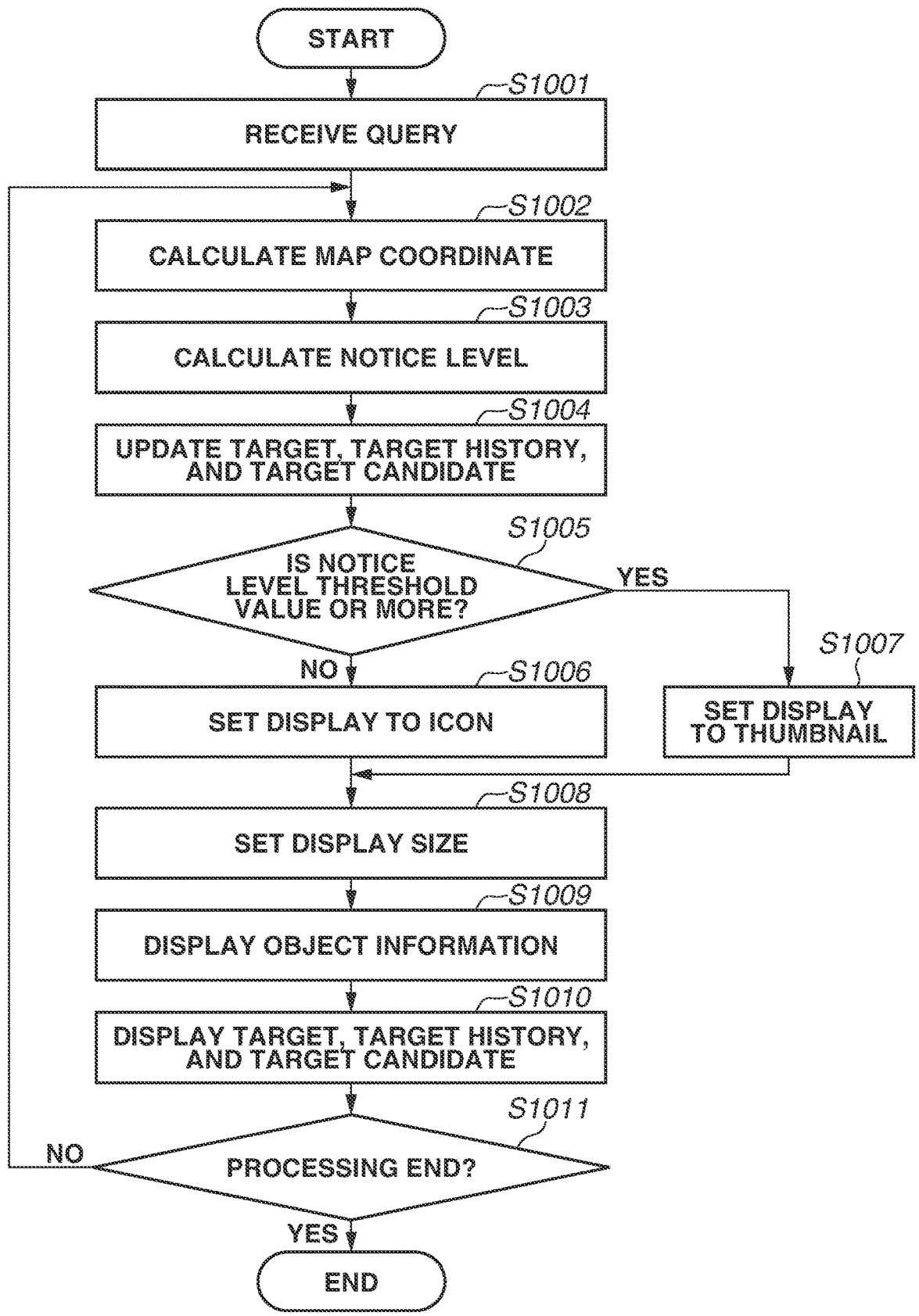
FIG. 11 is a flowchart (part 2) illustrating an example of information processing.

FIGS. 10 and 11 are flowcharts illustrating a flow of information processing according to the present exemplary embodiment.

First, information processing of creating object information will be described with reference to FIG. 10. In step S901, the image acquisition unit 201 acquires an image. In step S902, the image acquisition unit 201 determines whether the image is acquired. If the image is acquired, the image acquisition unit 201 determines that the image exists (YES in step S902), and the processing proceeds to step S903. If the image cannot be acquired, the image acquisition unit 201 determines that the image does not exist (NO in step S902), and the processing of the flowchart in FIG. 10 is ended. In step S903, the object detection unit 202 detects a plurality of objects from the image. In step S904, the object detection unit 202 determines whether any object is detected. If the object is detected, the object detection unit 202 determines that the object exists (YES in step S904), and the processing proceeds to step S905. If the object cannot be detected, the object detection unit 202 determines that the object does not exist (NO in step S904), and the processing returns to step S901. In step S905, the image clipping unit 203 creates a thumbnail. In step S906, the feature extraction unit 204 extracts a feature quantity. In step S907, the object information management unit 209 collectively saves the detection information, the thumbnail, and the feature quantity as the object information. In step S908, if the object detection unit 202 determines that any unprocessed object exists (YES in step S908), the processing proceeds to step S905. If the unprocessed object does not exist (NO in step S908), the processing returns to step S901.

Next, information processing of calculating a notice level of the object and displaying the object on a map will be described with reference to FIG. 11. In step S1001, the input unit 210 inputs a query based on a user operation via the input device 40 of the information processing apparatus 105. If the query is received, in step S1002, the map coordinate calculation unit 206 calculates a map coordinate of each object. In step S1003, the notice level calculation unit 207 calculates the notice level of the object. In step S1004, the target management unit 205 updates the target, the target history, and the target candidate. In step S1005, the display switching unit 208 determines whether the notice level of the object is a threshold value or more. If the display switching unit 208 determines that the notice level of the object is the threshold value or more (YES in step S1005), the processing proceeds to step S1007. If the notice level of the object is less than the threshold value (NO in step S1005), the processing proceeds to step S1006. In step S1006, the display switching unit 208 sets a display to an icon. In step S1007, the display switching unit 208 sets a display to a thumbnail. In step S1008, the display switching unit 208 sets a display size of the object. In step S1009, the display unit 211 displays the object information on the display device 50 of the information processing apparatus 105. In step S1010, the display unit 211 displays, for example, the target, the target history, and the target candidate on the display device 50 of the information processing apparatus 105. In step S1011, the display unit 211 determines whether to end the processing, for example, based on the user operation via the input device 40 of the information processing apparatus 105. If the display unit 211 determines that the processing is ended (YES in step S1011), the processing of the flowchart in FIG. 11 is ended. If the display unit 211 determines that the processing is not ended (NO in step S1011), the processing returns to step S1002.

As described above, in the present exemplary embodiment, because the feature quantity of the object is analyzed from a plurality of images and a result of collating the analysis result with the monitoring target is provided to the user based on the notice level, the user can check a position where the object exists and grasp the behavior of the notable object simultaneously. Therefore, a load of checking a result of image analysis can be reduced.

Next, processing of analyzing the notice level of the object from the image and switching the display between an icon and a thumbnail based on the notice level will be described.

Figure 12:
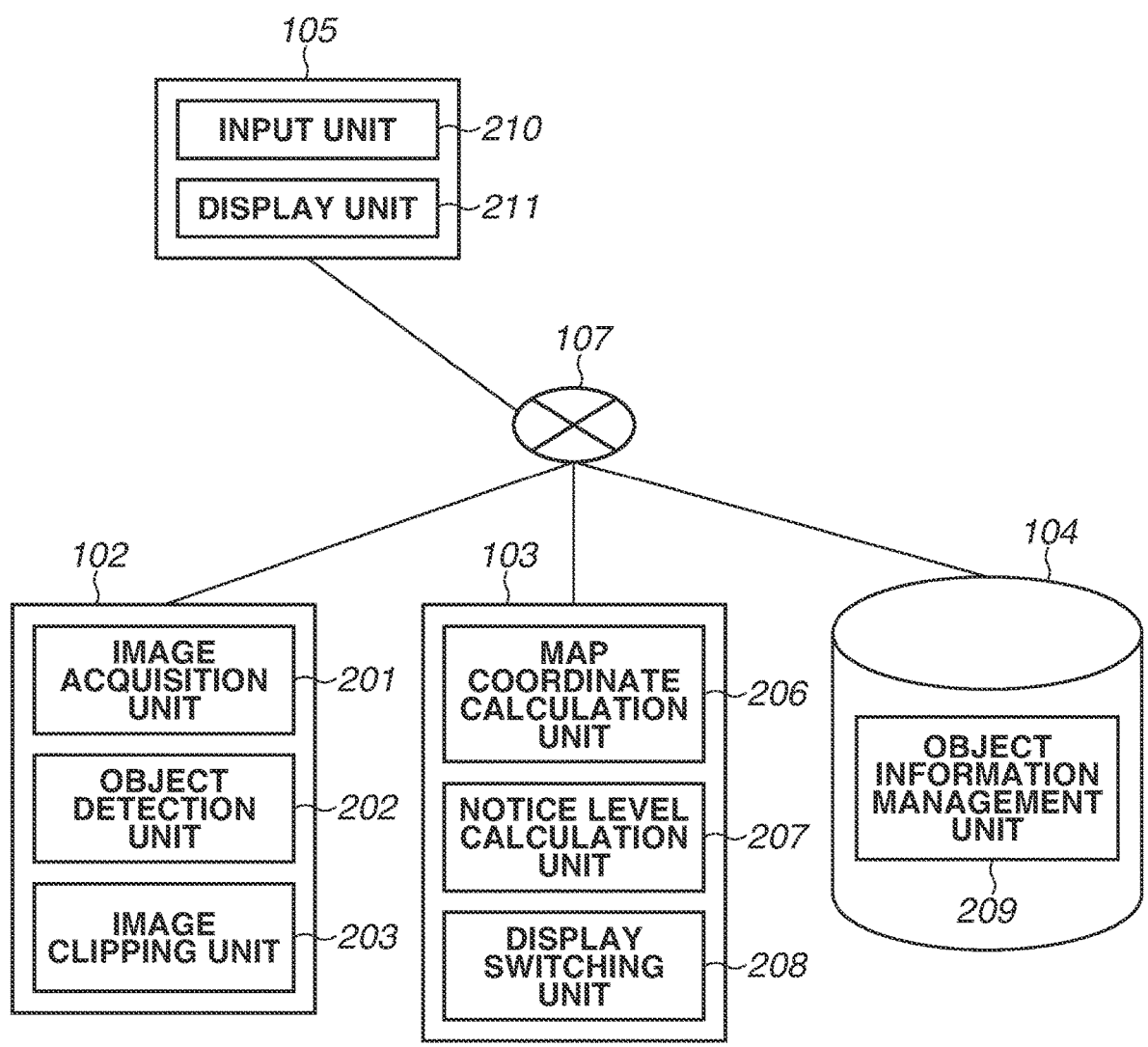
FIG. 12 is a diagram illustrating an example of a functional configuration of each apparatus constituting the image processing system.

FIG. 12 is a block diagram illustrating an example of a functional configuration of each of the apparatuses constituting the image processing system. As a functional configuration, the image processing system includes an image acquisition unit 201, an object detection unit 202, an image clipping unit 203, a map coordinate calculation unit 206, a notice level calculation unit 207, a display switching unit 208, an object information management unit 209, an input unit 210, and a display unit 211.

The notice level calculation unit 207 calculates a notice level of each object by using the object information saved in the object information management unit 209. The notice level calculation unit 207 acquires the notice level of the object by using an abnormal value or a residence value in the object unit.

First, a method of acquiring the notice level based on the abnormal value of the object will be described. The notice level calculation unit 207 recognizes the behavior of the object and acquires an abnormal value by determining the number of times of behavior defined as abnormal as the abnormal value. Alternatively, the notice level calculation unit 207 may define the abnormal level of behavior as the abnormal value. Then, the notice level calculation unit 207 determines the calculated abnormal value itself as the notice level. As a method of recognizing the behavior of the object, for example, the notice level calculation unit 207 may employ a technique of acquiring a posture of the object described in "B. X. Nie, C. Xiong, S-C. Zhu, Joint Action Recognition and Pose Estimation from Video" in IEEE Computer Society Conference on Computer Vision and Pattern Recognition (CVPR), 2015.

Next, a method of acquiring the notice level based on the residence value of the object will be described. The residence value indicates a span of object's stopping in certain location. The residence value, for example, is used for detecting a person who is stopping at the center of a busy corridor for a long time, because it is suspicious action. With respect to the object information saved by the object information management unit 209, the notice level calculation unit 207 arranges the map coordinates having the same object ID in the order of the detection time, and assumes that the object is retained if a sum of difference values of the map coordinates in a predetermined period is a certain value or less. The notice level calculation unit 207 calculates the residence value to be greater if the sum of the difference values of the map coordinates is smaller. Then, the notice level calculation unit 207 determines the calculated abidance value itself as the notice level.

Figure 13:
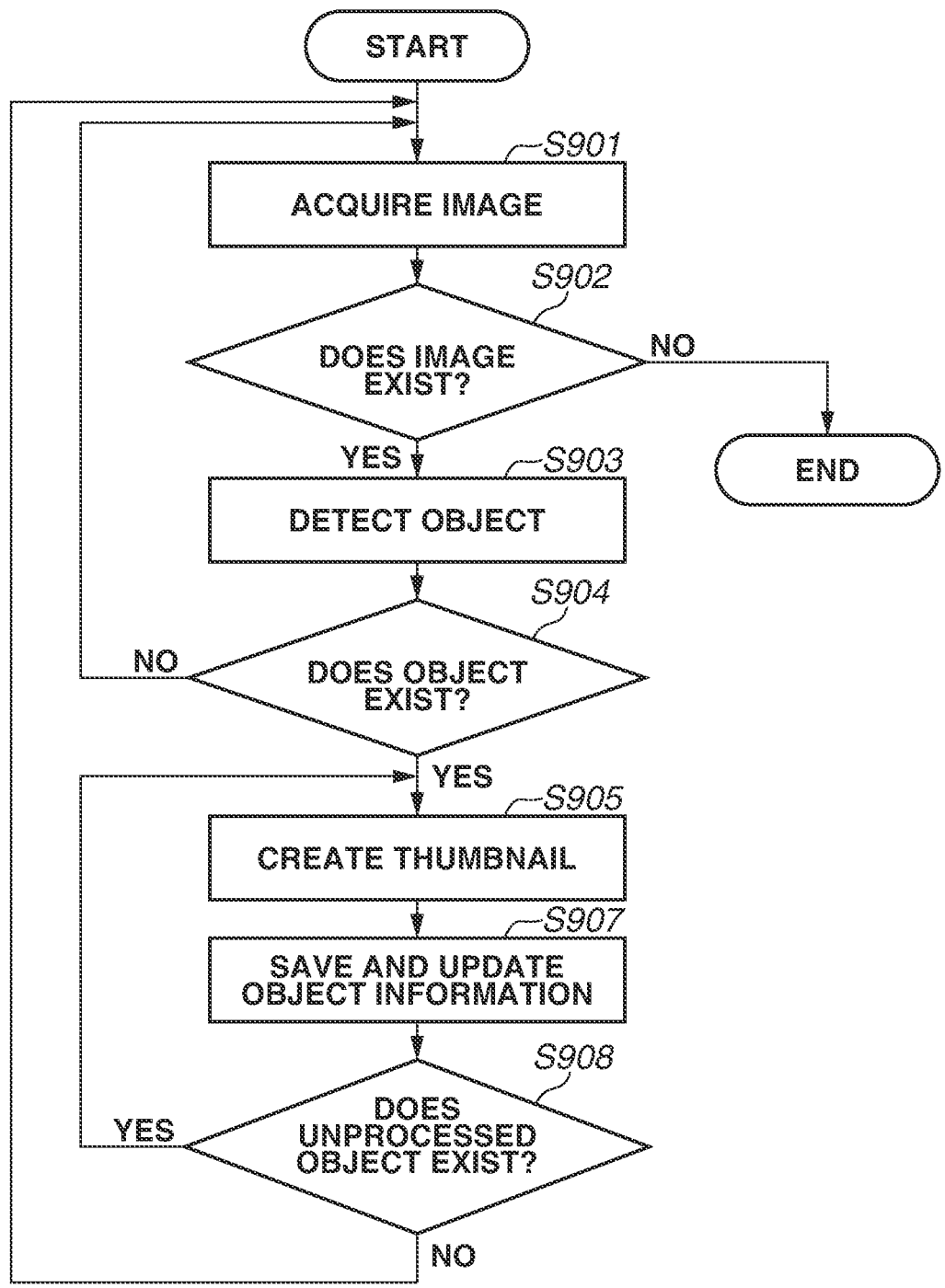
FIG. 13 is a flowchart (part 1) illustrating an example of information processing.
Figure 14:
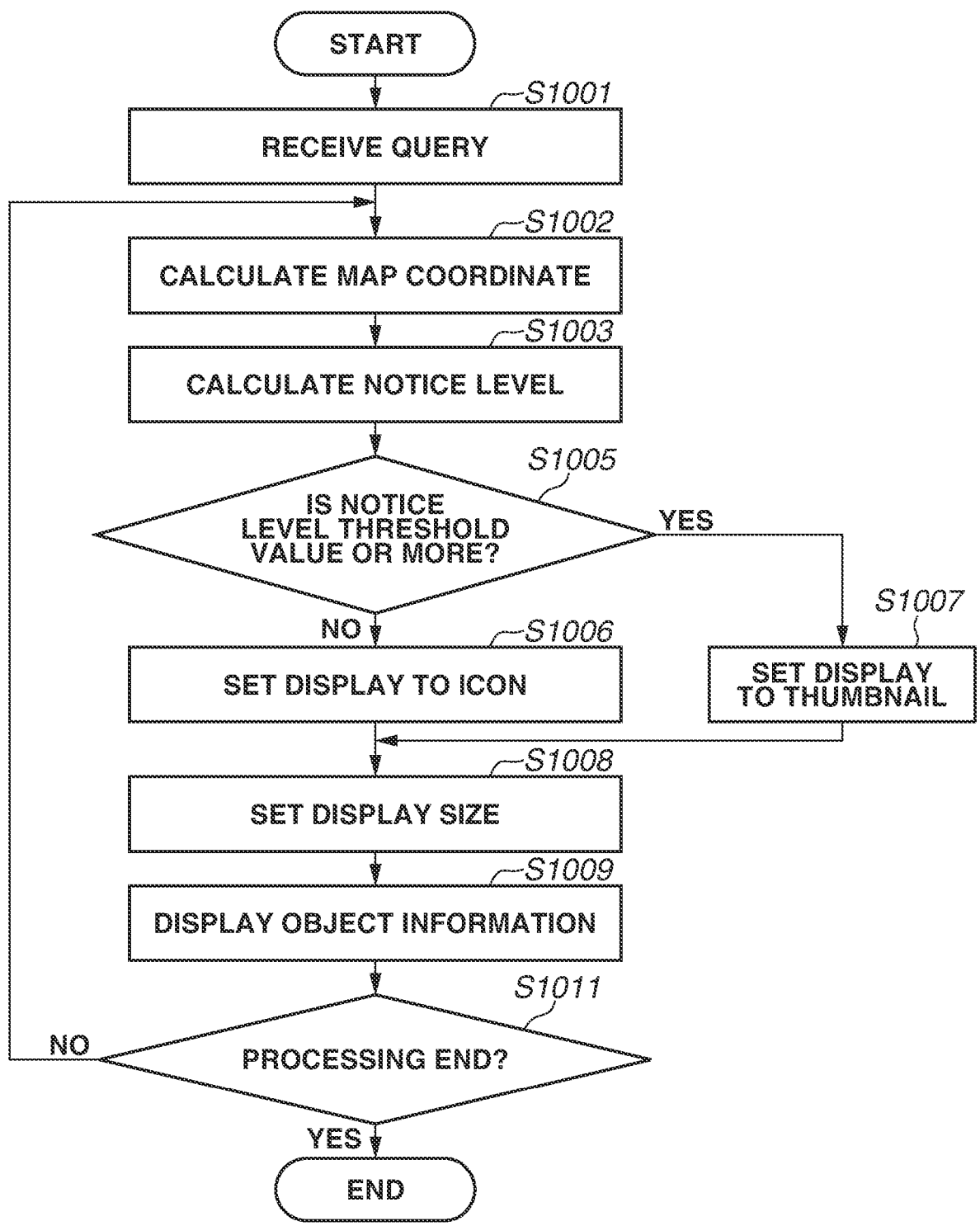
FIG. 14 is a flowchart (part 1) illustrating an example of information processing.

FIGS. 13 and 14 are flowcharts illustrating a flow of information processing according to the present exemplary embodiment.

First, information processing of creating object information will be described with reference to FIG. 13. In step S901, the image acquisition unit 201 acquires an image. In step S902, the image acquisition unit 201 determines whether the image is acquired. If the image is acquired, the image acquisition unit 201 determines that the image exists (YES in step S902), and the processing proceeds to step S903. If the image cannot be acquired, the image acquisition unit 201 determines that the image does not exist (NO in step S902), and processing of the flowchart in FIG. 13 is ended. In step S903, the object detection unit 202 detects a plurality of objects from the image. In step S904, the object detection unit 202 determines whether any object is detected. If the object is detected, the object detection unit 202 determines that the object exists (YES in step S904), and the processing proceeds to step S905. If the object cannot be detected, the object detection unit 202 determines that the object does not exist (NO in step S904), and the processing returns to step S901. In step S905, the image clipping unit 203 creates a thumbnail. In step S907, the object information management unit 209 collectively saves the detection information, the thumbnail, and the feature quantity as the object information. In step S908, if the object detection unit 202 determines that any unprocessed object exists (YES in step S908), the processing proceeds to step S905. If the unprocessed object does not exist (NO in step S908), the processing returns to step S901.

Next, information processing of calculating the notice level of the object and displaying the object on a map will be described with reference to FIG. 14. In step S1001, the input unit 210 receives a query based on a user operation via the input device 40 of the information processing apparatus 105. If the query is received, in step S1002, the map coordinate calculation unit 206 calculates a map coordinate of each object. In step S1003, the notice level calculation unit 207 calculates the notice level of each object. In step S1005, the display switching unit 208 determines whether the notice level of the object is a threshold value or more. If the display switching unit 208 determines that the notice level of the object is the threshold value or more (YES in step S1005), the processing proceeds to step S1007. If the notice level of the object is less than the threshold value (NO in step S1005), the processing proceeds to step S1006. In step S1006, the display switching unit 208 sets a display to an icon. In step S1008, the display switching unit 208 sets a display size of the object. In step S1009, the display unit 211 displays the object information on the display device 50 of the information processing apparatus 105. In step S1011, the display unit 211 determines whether to end the processing based on the user operation via the input device 40 of the information processing apparatus 105. If the display unit 211 determines that the processing is ended (YES in step S1011), the processing of the flowchart in FIG. 14 is ended. If the display unit 211 determines that the processing should not be ended (NO in step S1011), the processing returns to step S1002.

Figure 15A:
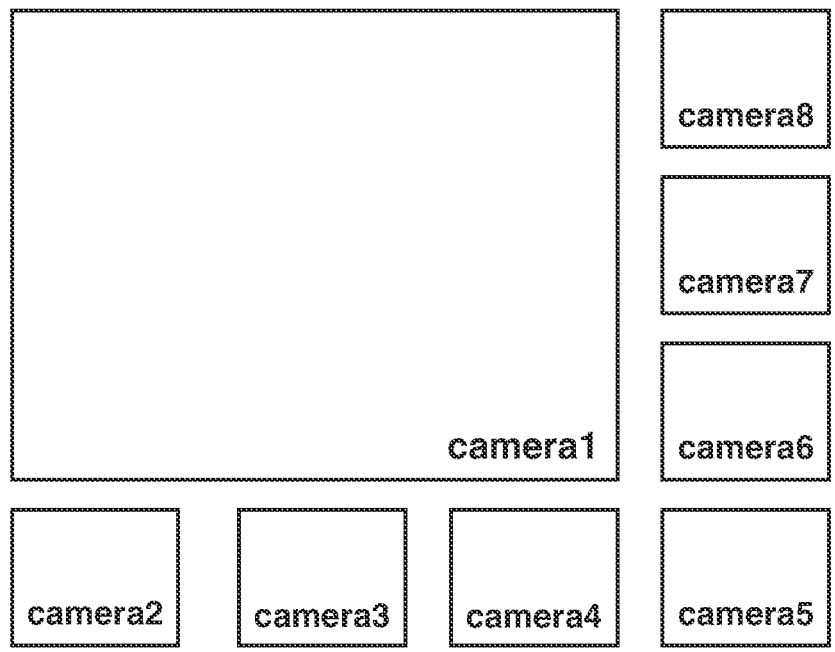
FIGS. 15A and 15B are diagrams each illustrating an example of a layout of display screens.
Figure 15B:
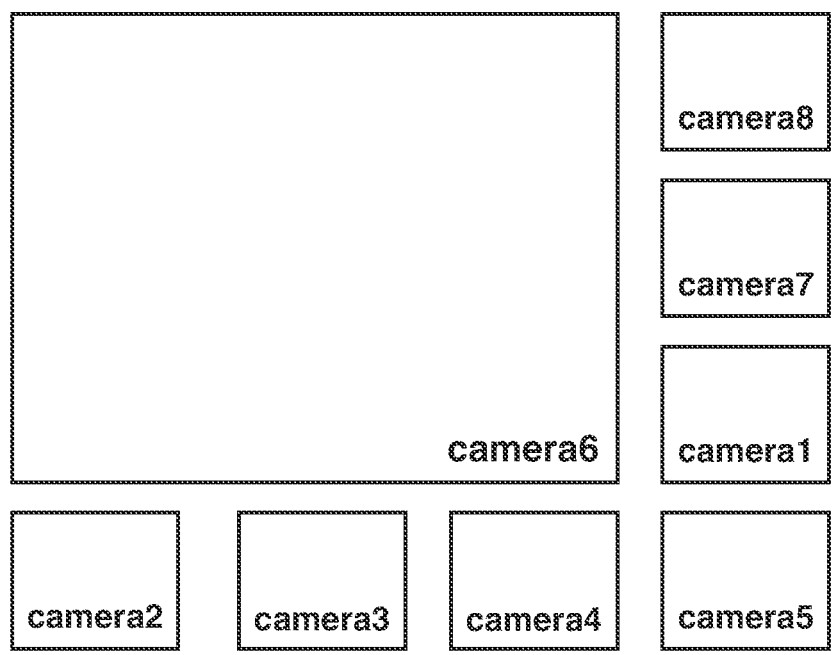

Next, a layout of the display screen displayed on the display device of the information processing apparatus 105 by the display unit 211 will be described. This processing is executed by the display switching unit 208. In the screen in FIG. 15A, a person as a tracking target is recognized in the image of "camera 1". As illustrated in FIG. 15A, a moving image captured by the camera 1 is displayed in a size larger than the sizes of the moving images captured by the other imaging apparatuses (cameras). In this state of the display screen in FIG. 15A, if a plurality of target candidates in an "unconfirmed" state is recognized in the images of the other cameras, a moving image of the camera (e.g., camera 6) including a target candidate having the highest collation score is displayed in a larger size. Similarly, if a person as a tracking target is recognized in a "confirmed" state in the image of another camera (e.g., camera 6), the layout is changed to a state of the display screen in FIG. 15B. In other words, a moving image captured by the camera 6, in which a person of the highest notice level is recognized, is displayed in a size larger than the sizes of images captured by the other cameras. Then, an arrangement position is changed to replace the moving image captured by the camera 1 with the moving image capture by the camera 6, so that the moving image captured by the camera 1 is displayed in a smaller size.

Other Exemplary Embodiments

In the present invention, a program for realizing one or more functions of the above-described exemplary embodiments is supplied to a system or an apparatus via a network or a storage medium. Then, one or more processors included in a computer of the system or the apparatus read and execute the program to realize the functions. Further, the present invention can be also realized with a circuit (e.g., application specific integrated circuit (ASIC)) that realizes the one or more functions.

Further, all or a part of the above-described functional configurations of respective apparatuses may be mounted on the apparatuses as a hardware configuration.

Further, the hardware configuration of the apparatus may include more than one CPU, storage device, or communication device. A plurality of CPUs may execute processing by using data stored in a plurality of storage devices based on a program stored in any one of the plurality of storage devices or the plurality of storage devices to realize the function of the apparatus.

Further, functions of the image analysis server apparatus 102, the data analysis server apparatus 103, the network storage apparatus 104, and the information processing apparatus 105 may be mounted on a single apparatus (i.e., computer). In that case the CPU 10 in computer functions as elements 201-209, the input device 40 functions as an input unit 210.

As described above, according to the above-described exemplary embodiments, a load of checking a result of image analysis can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-041547, filed Mar. 6, 2017, which is hereby incorporated by reference herein in its entirety.

What is claimed is:

1. An information processing apparatus for monitoring a monitoring region by using a plurality of captured images acquired by a plurality of imaging apparatuses, the information processing apparatus comprising:
at least one processor; and
a memory that is in communication with the at least one processor and stores one or more computer-readable instructions, wherein the computer-readable instructions cause, when executed by the at least one processor, the at least one processor to operate to:
detect a plurality of objects in the captured images;
input information about a tracking target in the monitoring region;
acquire a position of the object in the monitoring region;
acquire a similarity between the object and the tracking target based on information about the object detected by the at least one processor and information about the tracking target inputted by the at least one processor; and
display a map image corresponding to the monitoring region and a thumbnail image of the object detected by the at least one processor, which is clipped out of the captured image, at the position on the map image where the object is detected, in a case where the similarity is equal to or greater than a threshold value, and display an icon image at the position on the map image in a case where the similarity is less than the threshold value, and display a path line between the objects on the map, wherein the path line indicates a moving path of the tracking target,
wherein the path line is displayed such that a confirmed path line and an unconfirmed path line look different from each other.

2. The information processing apparatus according to claim 1, wherein the at least one processor operates to specify objects with the similarity equal to or greater than the threshold value as target candidates, determine the target from among the target candidates, and change a display format of the target candidates and a display format of the target.

3. The information processing apparatus according to claim 2, wherein at least one processor operates to display images respectively captured by the plurality of imaging apparatuses on a display screen and change the display format by changing display sizes of the image including the target and the image not including the target from among the images.

4. The information processing apparatus according to claim 2, wherein the at least one processor operates to display images captured by the plurality of imaging apparatuses on the display screen and change the display format by changing arrangement positions of the image including the target and the image not including the target from among the images.

5. The information processing apparatus according to claim 1, wherein the at least one processor further operates to extract a feature quantity of the object,
wherein the at least one processor operates to acquire a similarity by comparing the feature quantity of the object with a feature quantity of the target.

6. The information processing apparatus according to claim 1, wherein the at least one processor operates to further acquire an abnormal value of behavior of the object by recognizing behavior of the object which is classified as abnormal.

7. The information processing apparatus according to claim 1, wherein the at least one processor operates to further acquire a residence value of the object.

8. The information processing apparatus according to claim 1, wherein the at least one processor operates to change a display size of the thumbnail image of the object based on the similarity level of the object.

9. An information processing method of an information processing apparatus for monitoring a monitoring region by using a plurality of captured images acquired by a plurality of imaging apparatuses, the information processing method comprising:
detecting a plurality of objects in the captured images;
receiving information about a tracking target in the monitoring region;
acquiring a position of the object in the monitoring region;
acquiring a similarity between the object and the tracking target based on information of the detected object and received information of the tracking target; and
displaying a map image corresponding to the monitoring region and a thumbnail image of the first object, which is clipped out of the captured image, at the position on the map image where the object is detected, in a case where the similarity is equal to or greater than a threshold value, and displaying an icon image at the position on the map image in a case where the similarity is less than the threshold value, and display a path line between the objects on the map, wherein the path line indicates a moving path of the tracking target, wherein the path line is displayed such that a confirmed path line and an unconfirmed path line look different from each other.

10. A non-transitory computer-readable storage medium storing a program for causing a computer to carry out the method according to claim 9.

11. An information processing apparatus for monitoring a monitoring region by using a plurality of captured images acquired by a plurality of imaging apparatuses, the information processing apparatus comprising:
    at least one processor; and
    a memory that is in communication with the at least one processor and stores one or more computer-readable instructions, wherein the computer-readable instructions cause, when executed by the at least one processor, the at least one processor to operate to:
    detect a plurality of objects in the captured images;
        input information about a tracking target in the monitoring region;
        acquire a position of the object in the monitoring region;
        acquire a similarity between the object and the tracking target based on information about the object detected by the at least one processor and information about the tracking target inputted by the at least one processor; and
        display a map image corresponding to the monitoring region and a thumbnail image of the object detected by the at least one processor, which is clipped out of the captured image, at the position on the map image where the object is detected, in a case where the similarity is equal to or greater than a threshold value, and display an icon image at the position on the map image in a case where the similarity is less than the threshold value, and display a path line between the objects on the map, wherein the path line indicates a moving path of the tracking target,
    wherein the at least one processor operates to change a display size of the thumbnail image of the object based on a notice level of the object.

12. The information processing apparatus according to claim 11, wherein the notice level is an abnormal value of the object which indicates the number of behaviors defined as abnormal.

13. The information processing apparatus according to claim 11, wherein the notice level is a residence value of the object which indicates a span of the object's stopping in certain location.

14. An information processing method of an information processing apparatus for monitoring a monitoring region by using a plurality of captured images acquired by a plurality of imaging apparatuses, the information processing method comprising:
    detecting a plurality of objects in the captured images;
    receiving information about a tracking target in the monitoring region;
    acquiring a position of the object in the monitoring region;
    acquiring a similarity between the object and the tracking target based on information of the detected object and received information of the tracking target; and
    displaying a map image corresponding to the monitoring region and a thumbnail image of the first object, which is clipped out of the captured image, at the position on the map image where the object is detected, in a case where the similarity is equal to or greater than a threshold value, and displaying an icon image at the position on the map image in a case where the similarity is less than the threshold value, and display a path line between the objects on the map, wherein the path line indicates a moving path of the tracking target,
    wherein the at least one processor operates to change a display size of the thumbnail image of the object based on a notice level of the object.

15. The information processing method according to claim 14, wherein the notice level is an abnormal value of the object which indicates the number of behaviors defined as abnormal.

16. The information processing method according to claim 14, wherein the notice level is a residence value of the object which indicates a span of the object's stopping in certain location.

\* \* \* \* \*